C. P. STRITE.
GOVERNOR PULLEY DEVICE.
APPLICATION FILED SEPT. 20, 1910.
1,026,330.
Patented May 14, 1912.
2 SHEETS—SHEET 1.
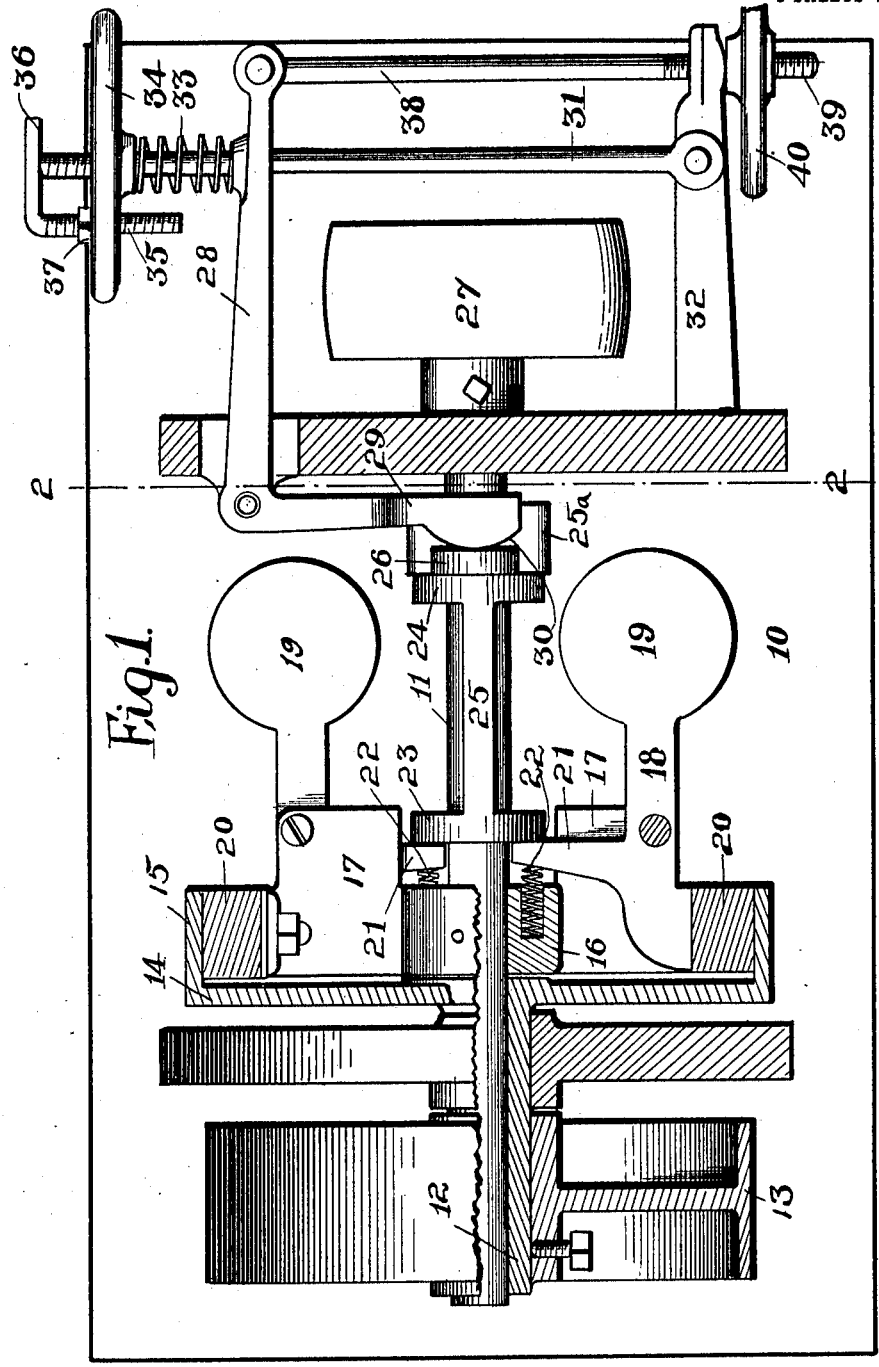
Witnesses
A. G. Hague
W. W. Loftus
Inventor
C. P. Strite
by J. Ralph Orwig atty

C. P. STRITE.
GOVERNOR PULLEY DEVICE.
APPLICATION FILED SEPT. 20, 1910.

1,026,330.

Patented May 14, 1912.
2 SHEETS—SHEET 2.

Witnesses
A. G. Hague
W. A. Loftus

Inventor
C. P. Strite
by J. Ralph Dwigatty

UNITED STATES PATENT OFFICE.

CHARLES P. STRITE, OF CEDAR RAPIDS, IOWA, ASSIGNOR TO CEDAR RAPIDS FOUNDRY & MACHINE COMPANY, OF CEDAR RAPIDS, IOWA.

GOVERNOR PULLEY DEVICE.

1,026,330.    Specification of Letters Patent.    Patented May 14, 1912.

Application filed September 20, 1910. Serial No. 582,845.

*To all whom it may concern:*

Be it known that I, CHARLES P. STRITE, a citizen of the United States, residing at Cedar Rapids, in the county of Linn and State of Iowa, have invented a certain new and useful Governor Pulley Device, of which the following is a specification.

The object of my invention is to provide a device of the class described, of simple, durable and inexpensive construction in which there is provided between the driving and the driven pulley automatic mechanism for throwing the driven pulley out of operation when the driving pulley attains a certain predetermined speed of rotation.

A further object is to provide means whereby the predetermined speed at which the driven pulley will be thrown out of operation may be manually adjusted quickly and easily; and further in this connection to provide a gage device whereby the operator may reset the adjusting mechanism after it has once been placed in position for throwing the driven pulley out of gear at a certain predetermined speed.

A further object is to provide a device of this kind which may be quickly and easily adjusted. I place the driving and the driven pulley into operative engagement in such a manner that they will rotate at any speed.

Figure 3:
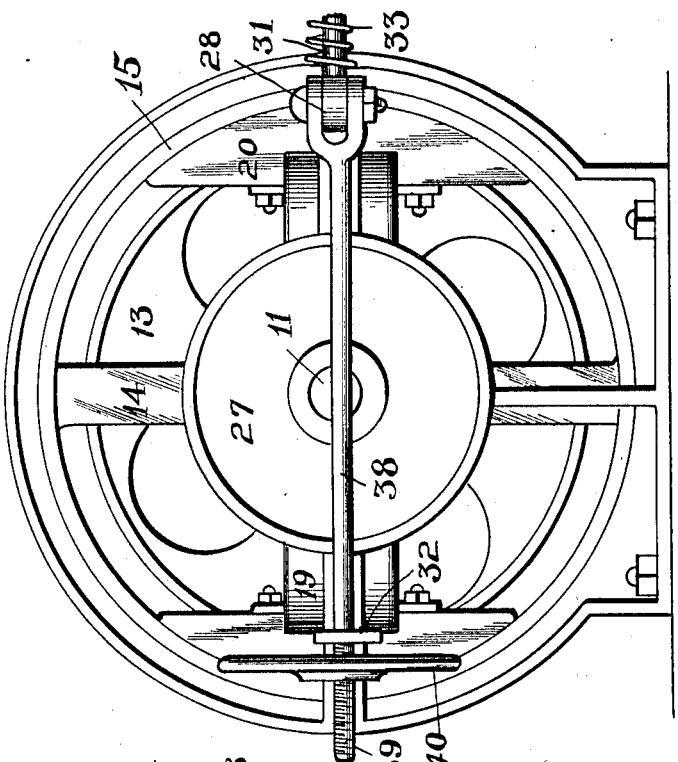
Figure 2:
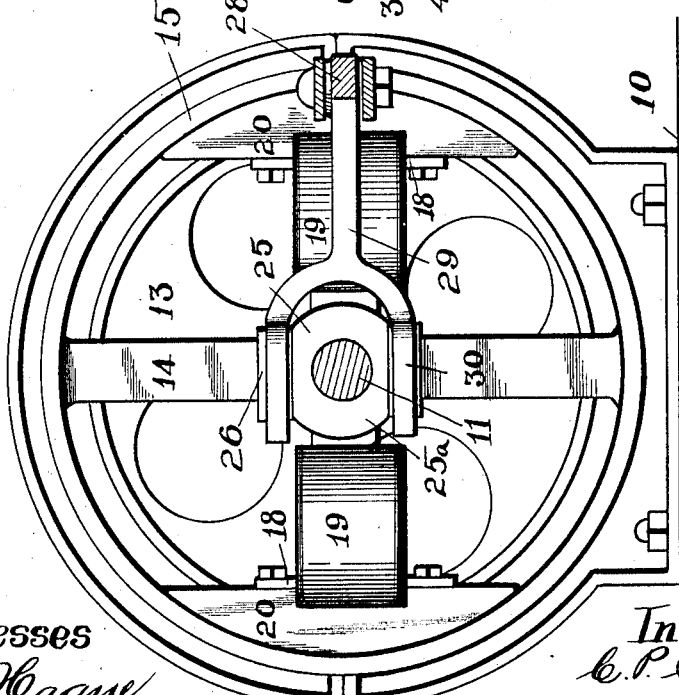

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a device embodying my invention, the friction wheel and adjacent parts being in section and the driving pulley and adjacent parts being partly in section. Fig. 2 shows a sectional view on the line 2—2 of Fig. 1, and Fig. 3 shows an end elevation of a device embodying my invention, the adjusting hand-wheel being removed.

Referring to the accompanying drawings, I have used the reference numeral 10 to indicate the base of the device. Mounted on the base in suitable bearings is a rotatable shaft 11. Rotatably mounted within the bearings for the shaft is a sleeve 12 through which the shaft is extended and which is rotatable relative to the shaft as well as to the bearing. Fixed to the sleeve 12 is a driving pulley 13 and fixed to the other end of the sleeve 12 is a friction wheel 14 having a flange 15 to be engaged by friction shoes hereinafter described.

Fixed to the shaft 11 within the friction wheel is a hub 16 which carries a bracket 17. Fulcrumed to said bracket are two friction shoe levers 18 provided at their outer ends with weights 19 and having the segmental friction shoe 20 fixed to their ends opposite from the weights. On each of the levers 18 is an arm 21 extended inwardly toward the shaft and mounted within the hub 16 is an extensible coil spring 22 for each of the arms 21, said springs being designed to engage said arms and yieldingly hold the arms away from the hub 16. The springs 22 tend to hold the weights outwardly and the friction shoes out of engagement with the friction wheel. The said segmental friction shoes are designed to engage the inner surface of the flange 15. Slidingly and rotatably mounted upon the shaft 11 are two annular collars 23 and 24 connected by the connecting members 25. The collar 23 is arranged in position to engage the arms 21 and slidingly rotatably mounted upon the shaft 11 adjacent to the collar 24 is a block 25ª having flat sides at its top and bottom, as shown in Fig. 2, and also provided with lugs 26 on said flat sides. On the end of the shaft 11 opposite from the pulley 13 is a driven pulley 27 fixed to the shaft.

For controlling the sliding movement of the collars 23 and 24, I have provided a bell crank lever 28 fulcrumed to a suitable support and having a forked end 29 designed to receive the block 25ª and being provided with two segmental surfaces 30 to engage the lugs 26 as shown in Fig. 1. Obviously by moving the handle end of the bell crank lever 28 in one direction, the block 25ª is free to move away from the friction wheel.

In order to control the movement of the bell crank lever 28, I have provided the following mechanism: A screw threaded rod 31 is pivoted at one end to a supporting arm 32 and is extended through an opening in the bell crank lever. Mounted on the rod in engagement with the bell crank lever is an extensible coil spring 33 and mounted on the screw threaded portion of the rod is a hand-wheel 34 to engage said spring.

I have provided a gage for determining the position of the hand-wheel 34 relative to the rod 31 consisting of a screw threaded rod 35 screwed into the hand-wheel 34 in a direction parallel with the rod 31. The rod 35 is provided with an extension 36 designed to project over the center of the hand-wheel 34 and to engage the end of the rod 31. A lock nut 37 is provided on the rod 35 for fastening it in any position in which it may be placed. Pivoted to the bell crank lever 28 is a rod 38 which is extended through an opening in the arm 32 and it is also provided with a screw threaded portion at 39. A hand-wheel 40 is mounted on it to engage the supporting arm 32.

In practical operation and assuming that it is desired to start the driven pulley by means of power applied to the driving pulley from an internal combustion engine or the like, then the operator releases both the hand-wheels 40 and 34 so that the collar 23 may move away from the arms 21 and the friction shoes may loosely engage the friction wheel. By this arrangement it is obvious that the driving pulley 13 may rotate without rotating the shaft 11. When the pulley 13 has attained a satisfactory speed then the operator manipulates the hand-wheel 34 to thereby compress the spring 33 so that it yieldingly engages the bell crank lever 28 which causes the block 25ª to force the collars 24 and 23 against the arms 21 to thereby clamp the friction shoes 20 against the friction wheel, thus causing the shaft 11 and pulley 27 to rotate in unison with the pulley 13. When the speed of rotation increases to a certain predetermined amount, the centrifugal action applied to the weights 19 will force the collars 23 and 24 away from the friction wheel and will compress the spring 33 so that the friction shoes may move slightly away from the friction wheel and the friction wheel may then rotate without driving the shaft 11 or the pulley 27. By a manipulation of the hand-wheel 34, the exact amount of speed that the shaft 11 may attain before throwing the driven pulley out of gear may be readily and easily adjusted. When the hand-wheel 34 has once been placed at the proper point of adjustment relative to the rod 31, the operator may provide for returning it to exactly the same point by means of the gage device consisting of the rod 35 and its arm 36. This gage device may be set so that the arm 36 will engage the end of the rod 31 and when in this position the lock nut 37 may be tightened. This gage device will prevent the hand-wheel 34 from moving inwardly on the rod 31 but it will not in any way interfere with moving the hand-wheel 34 outwardly toward the end of the rod 31 so that when it is desired to start the engine connected with the pulley 13, the hand-wheel 34 may be screwed outwardly and then after the engine has been started it may be screwed inwardly and it will stop at exactly the same point so that the exact amount of tension applied by the spring 33 and the bell crank lever 28 may be provided. The means for preventing this automatic action is of simple and inexpensive construction and consists simply of the rod 38 and the hand-wheel 40. When the hand-wheel 40 is placed in the position shown in Fig. 1, the weighted levers 18 are held against such movement as would permit the friction shoes to release from the friction wheel; hence the pulleys 13 and 27 will rotate in unison.

I claim as my invention:

1. In a device of the class described, the combination of a friction wheel, centrifugally operated friction shoes, designed in one position of their movement to frictionally engage said wheel, yielding means tending to hold the friction shoes away from the friction wheel, a sliding collar operatively connected with the friction shoes, whereby they may be forced into engagement with the friction wheel, a pivoted lever engaging said sliding collar, and means for adjusting the lever comprising a rod, a hand-wheel adjustably connected therewith and arranged, when moved in one direction, to force the lever to position for moving the friction shoes into engagement with the friction wheel, and adjustable means for limiting the movement of said hand wheel in one direction.

2. In a device of the class described, the combination of a friction wheel, centrifugally operated friction shoes to coact with the friction wheel, springs tending to oppose the centrifugal action and to hold the friction shoes away from the friction wheel, a sliding collar operatively connected with the friction shoes, whereby they may be forced into engagement with the friction wheel, a pivoted lever engaging said sliding collar, means for adjusting the said lever comprising a rod, a hand-wheel adjustably connected therewith and arranged, when moved in one direction, to force the lever to position for moving the friction shoes into engagement with the friction wheel, and an adjustable gage device operatively connected with the hand-wheel for limiting the adjustment of said lever when the hand-wheel is moved in one direction.

3. In a device of the class described, the combination of a friction wheel, centrifugally operated friction shoes to coact with the friction wheel, springs tending to oppose the centrifugal action and to hold the friction shoes away from the friction wheel, a sliding collar operatively connected with the friction shoes, whereby they may be forced into engagement with the friction wheel, a pivoted lever engaging said sliding collar, means for adjusting the said lever comprising a rod, a hand-wheel adjustably connected therewith and arranged, when moved in one direction, to force the lever to position for moving the friction shoes into engagement with the friction wheel, an adjustable gage device operatively connected with the hand-wheel for limiting the adjustment of said lever when the hand-wheel is moved in one direction, and a lock nut for said adjustable gage device.

4. In a device of the class described, the combination of a shaft, a driving pulley and a friction wheel connected with each other and rotatable on the shaft, friction shoes for the friction wheel carried by the shaft, weighted levers operatively connected with the friction shoes and arranged to move them away from contact with the friction wheel when rotated at high speed, a sliding collar on the shaft capable of holding the friction shoes in engagement with the friction wheel, a lever having one end capable of engaging said sliding collar, a screw threaded rod having one end stationary and the other end extended through said lever, a spring on the rod to engage the lever, a hand-wheel on the screw threaded portion of the rod to engage the spring, and an adjustable gage device carried by the hand-wheel to engage the rod and limit the movement of the hand-wheel relative to the rod in one direction.

5. In a device of the class described, the combination of a shaft, a driving pulley and a friction wheel connected with each other and rotatable on the shaft, a friction device for the friction wheel carried by the shaft, weighted levers operatively connected with the friction device and arranged to move it away from contact with the friction wheel when rotated at high speed, a sliding collar on the shaft for holding the friction device in engagement with the friction wheel, a lever having one end for engaging said sliding collar, a screw threaded rod having one end stationary and the other end extended through said lever, a spring on the rod to engage the lever, a hand-wheel on the screw threaded portion of the rod to engage the spring, a rod pivoted to the lever, a stationary support having said rod extended through it, and a hand-wheel adjustably mounted on the rod to engage the stationary support for securely holding the lever in position for holding the friction device applied to the friction wheel, for the purposes stated.

6. In a device of the class described, the combination of a shaft, a driving pulley rotatably mounted on the shaft, a friction wheel operatively connected with the driving pulley, a hub fixed to the shaft, a frame carried by the hub, two levers fulcrumed to said frame, a friction shoe on one end of each lever, a weight on the other end, an arm connected with each lever and extended toward the shaft, a spring carried by the hub to engage each arm, a collar slidingly mounted upon the shaft to engage said arms on the side opposite from said springs, a block slidingly and rotatably mounted on the shaft and having two flat sides, a lug on each of said flat sides, a bell crank lever having a forked end, said forked end being shaped to admit the said block and to engage the flat sides thereof, segmental portions on said forked ends to engage the lugs on the block, a rod connected to a stationary support and extended through the bell crank lever, an extensible coil spring on the rod to engage said lever, a hand-wheel screwed on the rod to engage the spring, a screw threaded rod extended through the hand-wheel and having an extension capable of engaging the outer end of the rod on which the hand-wheel is mounted, a lock nut for the rod carried by the hand-wheel, a rod connected to the lever and extended in a direction opposite from said coil spring, a stationary support through which the latter rod is extended and the hand-wheel screwed on the latter rod to engage its stationary support, for the purposes stated.

Des Moines, Iowa, September 5, 1910.

CHAS. P. STRITE.

Witnesses:
  D. B. GETTY,
  H. W. CONROD.

---

Copies of this patent may be obtained for five cents each, by addressing the "Commissioner of Patents, Washington, D. C."